(12) United States Patent
Lim

(10) Patent No.: US 9,068,632 B2
(45) Date of Patent: Jun. 30, 2015

(54) POWER TRANSMISSION DEVICE

(75) Inventor: Sun Ho Lim, Bucheon-si (KR)

(73) Assignee: SEJIN-IGB CO., LTD. (KR)

( * ) Notice: Subject to any disclaimer, the term of this patent is extended or adjusted under 35 U.S.C. 154(b) by 59 days.

(21) Appl. No.: 13/810,443

(22) PCT Filed: Feb. 9, 2011

(86) PCT No.: PCT/KR2011/000846
§ 371 (c)(1),
(2), (4) Date: Mar. 27, 2013

(87) PCT Pub. No.: WO2012/057410
PCT Pub. Date: May 3, 2012

(65) Prior Publication Data
US 2013/0186213 A1 Jul. 25, 2013

(30) Foreign Application Priority Data

Oct. 29, 2010 (KR) .................. 10-2010-0106487

(51) Int. Cl.
| | | |
|---|---|---|
| *F16H 57/08* | (2006.01) | |
| *F16H 19/04* | (2006.01) | |
| F16H 57/04 | (2010.01) | |
| F16H 1/28 | (2006.01) | |
| F16H 55/10 | (2006.01) | |

(52) U.S. Cl.
CPC ........... *F16H 19/04* (2013.01); *Y10T 74/18104* (2015.01); *F16H 57/08* (2013.01); *F16H 57/0482* (2013.01); *F16H 1/28* (2013.01); *F16H 55/10* (2013.01)

(58) Field of Classification Search
CPC ......... F16H 37/041; F16H 57/08; F16H 1/28; F16H 57/082; F16H 1/2827; F16H 55/26; F16H 57/0482; B62D 3/12

USPC ................ 475/207, 210, 323, 331, 343, 159; 74/422
See application file for complete search history.

(56) References Cited

U.S. PATENT DOCUMENTS

| | | | | |
|---|---|---|---|---|
| 5,382,132 A | * | 1/1995 | Mendel | ........................... 415/60 |
| 7,475,667 B2 | * | 1/2009 | Al-Bannai | ................. 123/197.1 |
| 8,671,788 B2 | * | 3/2014 | Lim | ............................. 74/89.11 |

(Continued)

FOREIGN PATENT DOCUMENTS

| | | |
|---|---|---|
| CN | 101101046 A | 1/2008 |
| DE | 10325781 B4 * | 1/2005 |

(Continued)

*Primary Examiner* — Roger Pang (57) ABSTRACT

Disclosed is a power transmission device. A power transmission device according to one embodiment of the present invention includes: an input gear connected to a motor so that the input gear may rotate by the motor in a forward and backward direction; a planetary gear train circumscribing the input gear with respect to the input gear and rotating in association with the rotation of the input gear; a ring gear inscribing the planetary gear train and rotating relative to the planetary gear train; a main frame having a plurality of rollers coupled along the circumferential direction and interacting with a rack, and coupled with the ring gear on the outside of the ring gear; an irrotational rear side fixture disposed on an area where the input gear is positioned; and an irrotational front side fixture disposed at the opposite side of the irrotational rear side fixture via the ring gear and the main frame therebetween and coupled with the irrotational rear side fixture.

15 Claims, 8 Drawing Sheets

(56) References Cited

U.S. PATENT DOCUMENTS

| | | |
|---|---|---|
| 2005/0277513 A1 | 12/2005 | Larson |
| 2007/0202986 A1* | 8/2007 | Kotani et al. ............... 475/331 |
| 2013/0102432 A1* | 4/2013 | Imai et al. .................. 475/159 |

FOREIGN PATENT DOCUMENTS

| | | |
|---|---|---|
| EP | 2169261 A2 | 3/2010 |
| JP | 60190845 | 12/1985 |
| JP | 63-135046 | 9/1988 |
| JP | 10184842 | 7/1998 |
| JP | 2010216551 A | 9/2010 |
| KR | 10-1990-0000616 | 2/1990 |
| KR | 10-0301120 | 6/2001 |
| KR | 10-0945193 | 2/2010 |

* cited by examiner

POWER TRANSMISSION DEVICE

TECHNICAL FIELD

The present invention relates to a power transmission device, and more particularly, to a power transmission device having a simple structure which may reduce installation height so as to be easily applied to compact equipment, may reduce use of complicated peripheral accessories unlike a conventional technology, and further, may remarkably reduce frequencies of a maintenance work and a cleaning work compared to the conventional technology, thereby preventing a process delay.

BACKGROUND ART

A power transmission device is generally classified into a rack and pinion for converting a rotational motion into a linear motion or vice versa and a gear train for converting a rotation speed and torque while transferring only a rotational motion. Typically, a power transmission system of a power transmission device mainly uses a tooth shape based on an involute curve, but a tooth shape based on a cycloid curve and a pin gear are uncommonly used. The power transmission device is widely used for various industrial machines such as semiconductor equipment.

Figure 1:
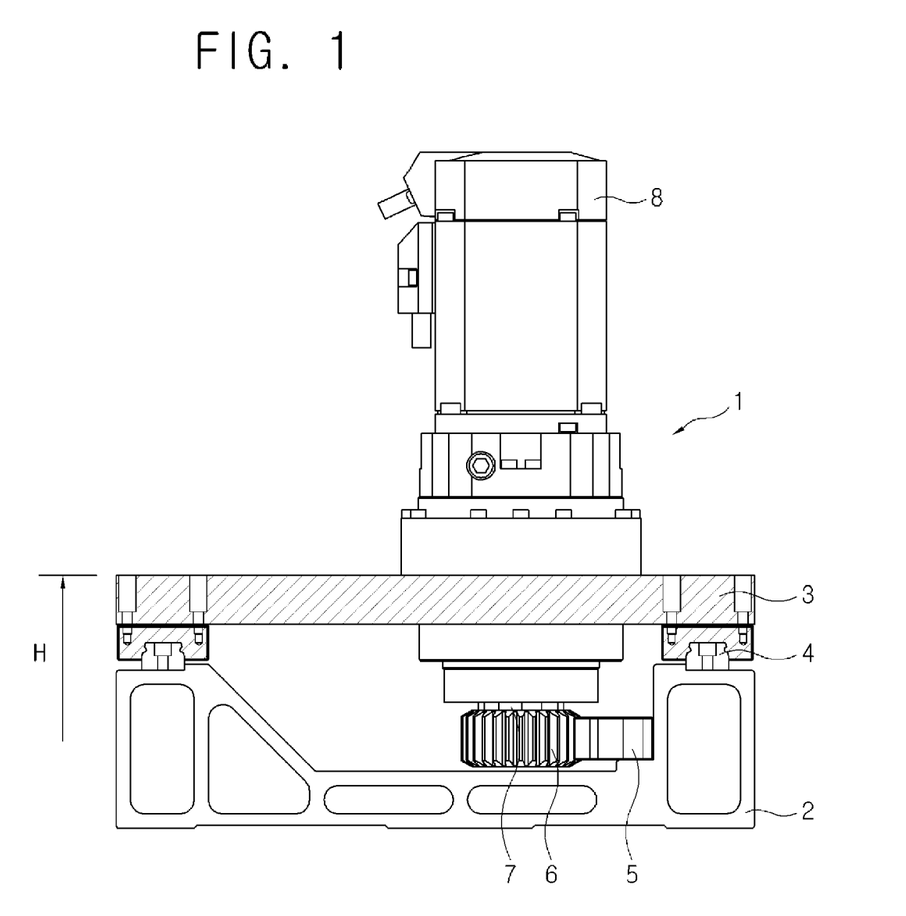
FIG. 1 is a side structural view schematically illustrating a use state of a conventional power transmission device 1.

FIG. 1 is a side structural view schematically illustrating a use state of a conventional power transmission device 1. The conventional power transmission device 1, as illustrated in FIG. 1, may be partially coupled to a slider 3 (a hatched portion of FIG. 1) that is, for example, coupled to a base plate 2 in a structure of a rail 4 so as to allow the slider 3 to perform a linear motion.

For the linear motion of the slider 3 with respect to the base plate 2, the power transmission device 1 connected to the slider 3 are provided with a rack 5 fixed in an area of the base plate 2 and a pinion 6 engaged with the rack 5. The pinion 6 is coupled to an end portion of a shaft 7 that extends outwardly from the power transmission device 1 and engaged with the rack 5 during the coupling as shown in FIG. 1.

In the above structure, when a motor 8 of the power transmission device 1 is operated, the shaft 7 is rotated based on interaction among parts included in the power transmission device 1 and then the pinion 6 is rotated. In doing so, since the pinion 6 is engaged with the rack 5 that is fixed, the pinion 6 that rotates performs a linear motion along the lengthwise direction of the rack 5 and thus the slider 3 performs a linear motion with respect to the base plate 2. Accordingly, when a desired part or apparatus is loaded on the slider 3, the part or apparatus may be linearly moved.

The above structure of the power transmission device 1 of FIG. 1 is the most widely used structure on the spot. However, since the power transmission device 1 of FIG. 1 has a structure in which the shaft 7 protrudes outwardly and the pinion 6 is coupled to the end portion of the shaft 7, foot print, in particular, installation height H, increases so that it is difficult to apply the power transmission device 1 of FIG. 1 to compact equipment. Also, there are various problems such that complicated peripheral accessories such as a gear box or a shrink fitting to coupling are needed, the vicinity of equipment is contaminated because lubrication oil is coated on an outer surface of the pinion 6, and the maintenance work and the cleaning work are frequently needed due to its structure so that the process is delayed. Thus, improvement of a structure is needed.

DETAILED DESCRIPTION OF THE INVENTION

Technical Problem

The present invention provides a power transmission device having a simple structure which may reduce installation height so as to be easily applied to compact equipment, may reduce use of complicated peripheral accessories unlike a conventional technology, and further, may remarkably reduce frequencies of a maintenance work and a cleaning work compared to the conventional technology, thereby preventing a process delay.

BEST MODE

According to an aspect of the present invention, there is provided a power transmission device including an input gear connected to a motor and rotated by the motor in forward and backward directions, a planetary gear train circumscribing the input gear around the input gear and rotating in association with a rotation of the input gear, a ring gear inscribed by the planetary gear train and relatively rotated by the planetary gear train, a main frame to which a plurality rollers that interact with a rack and relatively rotate are coupled in a circumferential direction, the main frame being coupled to the ring gear around the ring gear, an irrotational rear side fixture arranged in an area where the input gear is located, and an irrotational front side fixture arranged between the ring gear and the main frame at a side opposite to the irrotational rear side fixture and coupled to the irrotational rear side fixture.

The main frame may include a front frame portion having a plurality of first roller insertion holes into which the plurality of rollers are inserted, a rear frame portion having a plurality of second roller insertion holes connected to the plurality of first roller insertion holes and arranged parallel to the front frame, and a connection portion connecting the front frame portion and the rear frame portion.

A ring gear connection rib to which the ring gear is connected may be further provided inside the connection portion.

A lubricant flow hole through which a lubricant flows along a lengthwise direction of each of the plurality of rollers may be provided in each of the plurality of rollers.

A lubricant outlet and a lubricant inlet, through which the lubricant is respectively exhausted and admitted in communication with the lubricant flow hole, may be provided in a side wall of each of the plurality of rollers.

The lubricant outlet and the lubricant inlet may be arranged to face the opposite directions in a radial direction of each of the plurality of rollers in an area of each end portion of the lubricant flow hole.

A lubricant flow channel for allowing flow of the lubricant may be further provided between the neighboring first roller insertion holes or the neighboring second roller insertion holes.

The lubricant flow channel may be provided at the front frame portion to be connected to the plurality of first roller insertion holes.

The power transmission device may further include an oil seal coupled to each of end portions of each of the plurality of rollers and hermitically sealing a corresponding position, and a centrifugal bearing coupled to each end portion of each of the plurality of rollers at a position outside the oil seal and facilitating a rotation of each of the plurality of rollers.

The power transmission device may further include at least one main bearing arranged in an area between the irrotational rear side fixture and the main frame or between the main frame and the irrotational front side fixture and facilitating a rotation of the main frame.

The main bearing may include a rear main bearing arranged between the irrotational rear side fixture and the main frame, and a front main bearing arranged between the main frame and the irrotational front side fixture.

A plurality of protruding portions extending toward the irrotational rear side fixture may be provided at the irrotational front side fixture, and a needle bearing may be coupled to each of the plurality of protruding portion and connected to the planetary gear train.

The power transmission device may further include a rear side sealing cover arranged outside the irrotational rear side fixture and supporting the irrotational rear side fixture, and a front side sealing cover arranged outside the irrotational front side fixture and supporting the irrotational front side fixture.

An oil seal may be further arranged between the rear side sealing cover and the irrotational rear side fixture and between the front side sealing cover and the irrotational front side fixture.

The power transmission device may further include an input gear support member supporting the input gear, an adaptor on which the motor is accommodated, and at least one connection device rotatably connecting the input gear support member to the motor adaptor.

The connection device may include an input gear support bearing inserted around the input gear support member and connected to a flange area of the input gear support member, a clamp inserted around the input gear support member with the input gear support bearing and coupling a motor shaft of the motor to the input gear support motor, and an oil seal coupled to the input gear support member to prevent leakage of the lubricant between the input gear support bearing and the clamp.

The planetary gear train may include three planetary gears that are teeth-engaged with an outer surface of the input gear and an inner surface of the ring gear and rotated in association with a rotation of the input gear.

MODE OF THE INVENTION

The attached drawings for illustrating exemplary embodiments of the present invention are referred to in order to gain a sufficient understanding of the present invention, the merits thereof, and the objectives accomplished by the implementation of the present invention. Hereinafter, the present invention will be described in detail by explaining exemplary embodiments of the invention with reference to the attached drawings. Like reference numerals in the drawings denote like elements.

Figure 2:
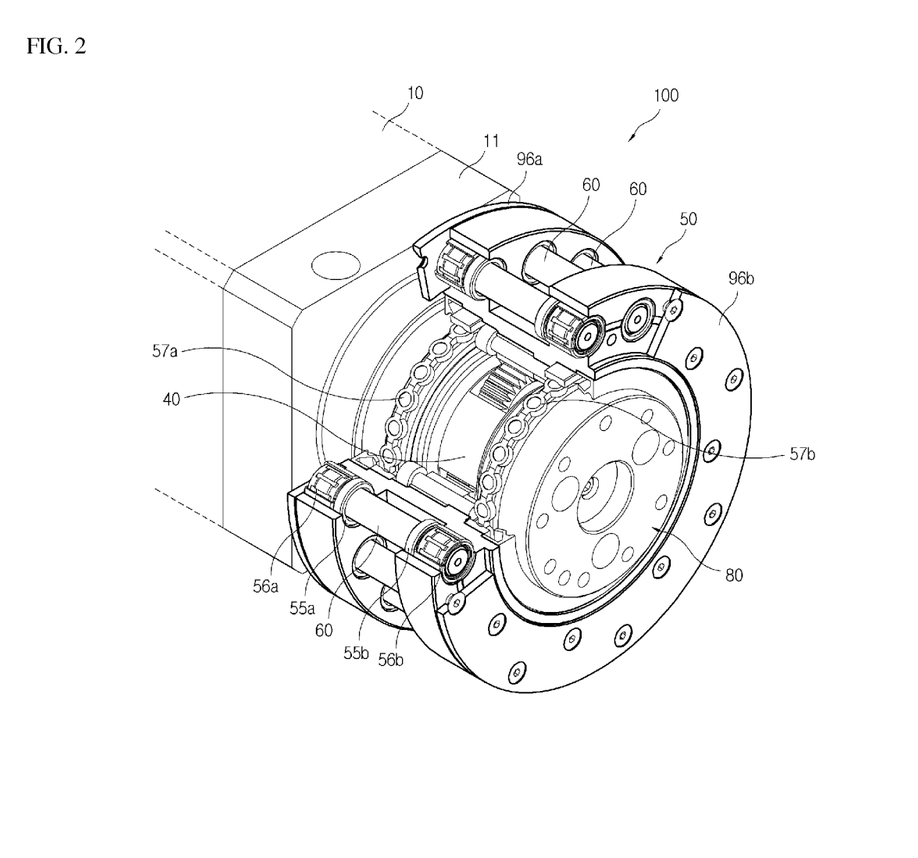
FIG. 2 is a partially cut-away perspective view schematically illustrating a power transmission device according to an embodiment of the present invention.
Figure 3:
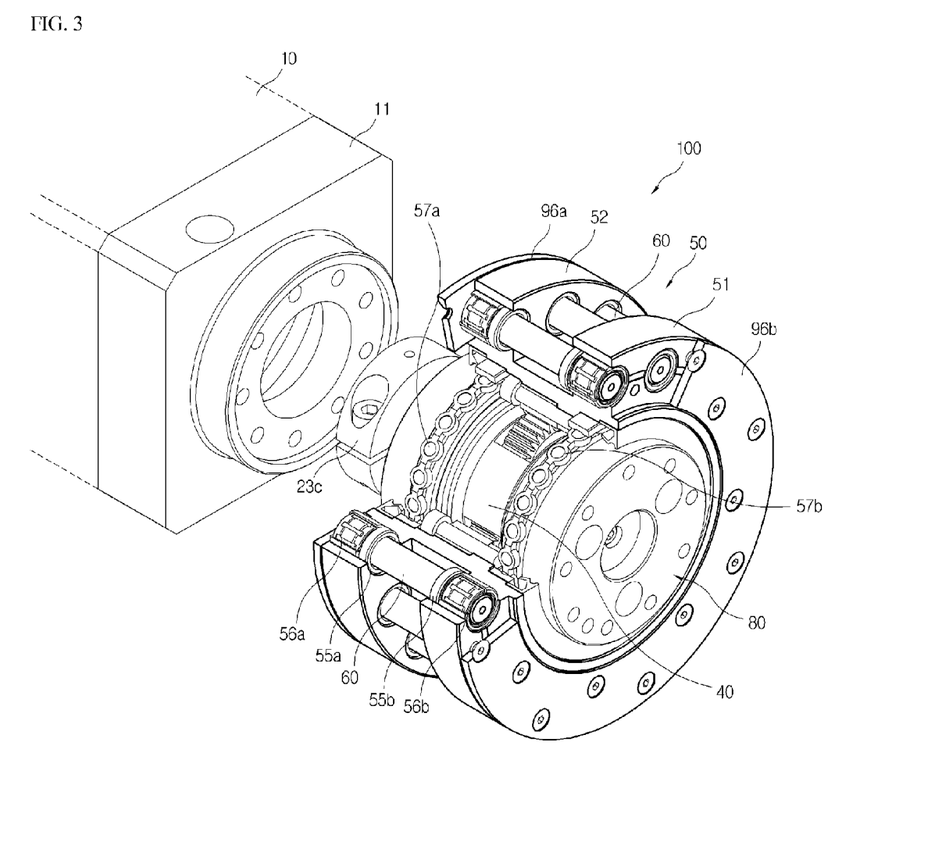
FIG. 3 is a perspective view schematically illustrating a separated state of a motor adaptor of FIG. 2.
Figure 4:
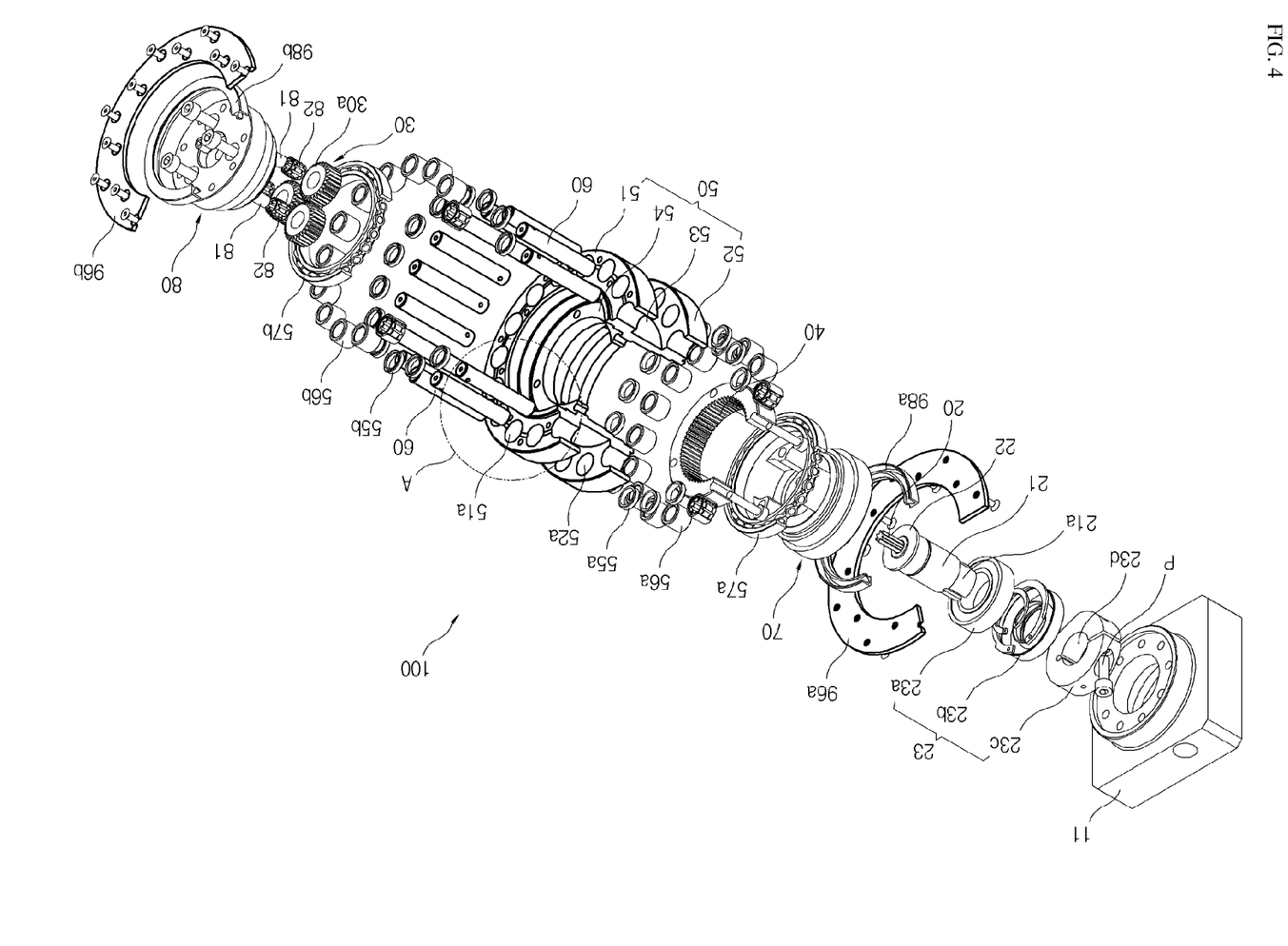
FIG. 4 is an exploded perspective view of FIG. 2.
Figure 5:
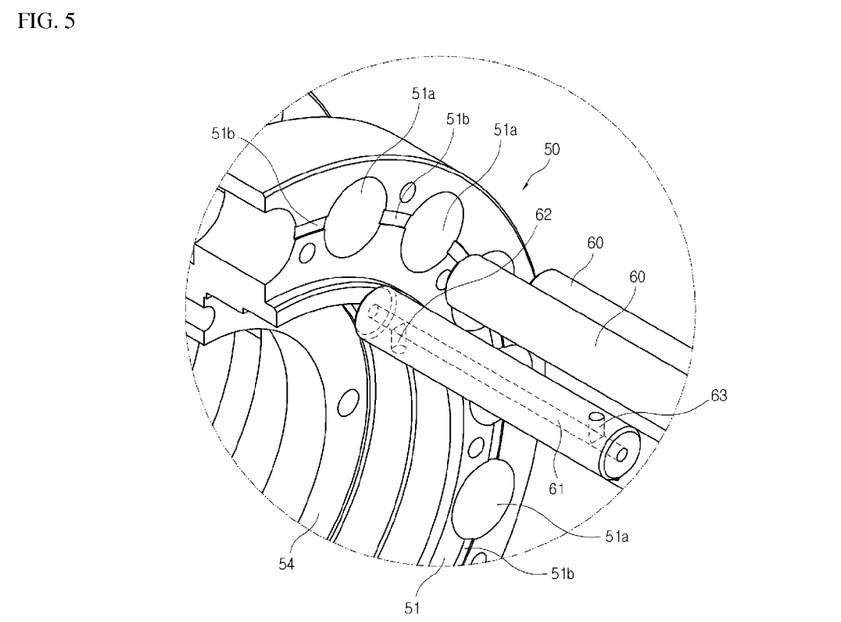
FIG. 5 is a magnified view of an area A of FIG. 4.

FIG. 2 is a partially cut-away perspective view schematically illustrating a power transmission device 100 according to an embodiment of the present invention. FIG. 3 is a perspective view schematically illustrating a separated state of a motor adaptor 11 of FIG. 2. FIG. 4 is an exploded perspective view of FIG. 2. FIG. 5 is a magnified view of an area A of FIG. 4.

Referring to FIGS. 2 through 5, the power transmission device 100 according to the present embodiment includes an input gear 20 connected to a motor 10 (see FIGS. 6 and 7) and capable of rotating in forward and backward directions by the motor 10, a planetary gear train 30 circumscribing the input gear 20 around the input gear 20 and capable of rotating in association with the rotation of the input gear 20, a ring gear 40 inscribed by the planetary gear train 30 and relatively rotated by the planetary gear train 30, a main frame 50 to which a plurality of rollers 60 relatively rotating in interaction with a rack 15 (see FIGS. 6 and 7) are coupled in a circumferential direction, and coupled to the ring gear 40 outside the ring gear 40, an irrotational rear side fixture 70 arranged in an area where the input gear 20 is located, and an irrotational front side fixture 80 arranged at the opposite side to the irrotational rear side fixture 70 with the ring gear 40 and the main frame 50 interposed therebetween and coupled to the irrotational rear side fixture 70.

The motor 10 generates a rotational power according to electric power applied thereto. The motor 10 may be a servo motor capable of rotating in forward and backward directions with easy control. However, the present invention is not limited thereto and other various motors such as a step motor may be employed instead.

The input gear 20 receives the rotational power from the motor 10 and rotates in a forward or backward direction. Thus, the input gear 20 is connected to the motor 10, of which (connection) structure is described with reference to FIG. 4.

The input gear 20 is supported by an input gear support member 21 as illustrated in FIG. 4. In other words, in the present embodiment, the input gear 20 may be coupled to or may be integrally processed with an end portion of the input gear support member 21 substantially having a shape of a shaft. A flange 22 having a relatively large diameter than the other portions of the input gear support member 21 is provided around the end portion of the input gear support member 21 where the input gear 20 is located.

The motor 10 is accommodated on and supported by a motor adaptor 11. The input gear support member 21 is rotatably connected to the motor adaptor 11 via a connection device 23.

The connection device 23 includes an input gear support bearing 23a connected to an area of the flange 22 of the input gear support member 21 by being inserted in the input gear support member 21, a clamp 23c inserted in the input gear support member 21 with the input gear support bearing 23a and allowing a motor shaft (not shown) of the motor 10 to be coupled to the input gear support member 21, and an oil seal 23b coupled to the input gear support member 21 to prevent oil leakage between the input gear support bearing 23a and the clamp 23c.

The input gear support bearing 23a is coupled in contact with the area of the flange 22 of the input gear support member 21. The clamp 23c is coupled to the input gear support member 21, forming one body with the input gear support member 21.

The clamp 23c has a shape of a ring with one open side. When a plurality of leg portions 21a provided at an end portion of the input gear support member 21 are inserted into a through hole 23d of the clamp 23c, the motor shaft of the motor 10 coupled from the opposite side to the clamp 23c may form one body with the input gear support member 21 by screwing a bolt P located at the open side of the clamp 23c to close the open side. In other words, when the motor shaft of the motor 10 is inserted between the leg portions 21a, the clamp 23c clamps the leg portions 21a inwardly so that the motor shaft of the motor 10 may be held between the leg portions 21a.

After the motor 10 is connected to the motor adaptor 11, the motor shaft of the motor 10 is fixedly held by the clamp 23c on the input gear support member 21 and thus a final coupling state as illustrated in FIG. 2 is obtained. In this state, when the motor 10 is rotated in the forward or backward direction, the input gear support member 21 is rotated in association with the rotation of the motor 10 and thus the input gear 20 at the end portion of the input gear support member 21.

The planetary gear train 30 circumscribing the input gear 20 around the input gear 20 is rotated in association with the rotation of the input gear 20. In the present embodiment, the planetary gear trains 30 is teeth-engaged with the outer surface of the input gear 20 and the inner surface of the ring gear 40 and includes three planetary gears 30a that are rotated in association with the rotation of the input gear 20. The tree planetary gears 30a have the same shape and structure.

Although, in the present embodiment, the planetary gear train 30 is provided by using the three planetary gears 30a in a plane arrangement state, the number and arrangement structure of the planetary gears 30a forming the planetary gear train 30 may be different from those shown in the drawings.

For example, in a case of increasing a deceleration rate, the number of the planetary gears 30a may be decreased. In a case of providing a strong torque output, the number of planetary gears 30a may be increased. Also, since an inscribing type planetary gear train may be provided instead of a general planetary gear (train), the structure of an inner power transmission part may sufficiently vary according to a situation. Accordingly, the right scope of the present invention may not be limited to the limitations illustrated in the drawings. As a result, the planetary gear train 30 may be freely replaced with, for example, an inscribing type planetary gear train.

The ring gear 40 is inscribed by the planetary gear train 30 formed of the three planetary gears 30a.

Although it is described later, when the planetary gear train 30 is rotated by input rotation power of the input gear 20, the ring gear 40 is relatively rotated with respect to the planetary gear train 30. This is because the irrotational front side fixture 80 connected to the planetary gear train 30 maintains an irrotational or fixed state.

In a typical case, when the planetary gear train 30 is rotated by the input rotation power of the input gear 20, it is general that the irrotational front side fixture 80 is identically rotated. In the present embodiment, however, since the irrotational front side fixture 80 maintains a fixed state, the ring gear 40 circumscribed by the planetary gear train 30 is rotated. As a result, in the present embodiment, the input rotation power of the input gear 20 is transmitted as the rotational motion of the ring gear 40 via the planetary gear train 30.

The main frame 50 is coupled to the ring gear 40 outside the ring gear 40. As described above, since the input rotation power of the input gear 20 is transmitted as the rotational motion of the ring gear 40, the ring gear 40 is rotated and thus the main frame 50 is identically rotated with the ring gear 40.

A plurality of rollers 60 interacting with the rack 15 (see FIGS. 6 and 7) and relatively rotating with respect to the rack 15 are coupled to the main frame 50 in a circumferential direction. The teeth shape of the rack 15 may include both of cycloid and trochoid.

Referring to FIGS. 4 and 5, the structures of the main frame 50 and the rollers 60 are described in detail.

The main frame 50, as illustrated in FIG. 4, may largely include three parts, that is, a front frame portion 51, a rear frame portion 52, and a connection portion 53. The front frame portion 51, the rear frame portion 52, and the connection portion 53 are mere classification according to the position of each part for convenience of explanation and these parts may be rather manufactured in one body.

The front frame portion 51 has a disc type structure facing the planetary gear train 30. A plurality of first roller insertion holes 51a, into which a plurality of rollers 60 are inserted, are provided in the front frame portion 51. The first roller insertion holes 51 a are provided as many as the number of the rollers 60 and are regularly arranged at an equiangular interval along the circumferential direction of the front frame portion 51.

The rear frame portion 52 has a disc type structure facing the motor adaptor 11 and is arranged parallel to the front frame portion 51. A plurality of second roller insertion holes 52a into which the rollers 60 are inserted are provided in the rear frame portion 52 to communicate with the first roller insertion holes 51a.

As a result, as illustrated in FIGS. 2 and 3, the rollers 60 may be connected to the main frame 50 such that the opposite ends of each roller 60 are inserted into the first and second roller insertion holes 51a and 52a.

The connection portion 53 connects the front frame portion 51 and the rear frame portion 52. The connection portion 53 is provided to have a diameter smaller than those of the front frame portion 51 and the rear frame portion 52 so that the rollers 60 are not interfered during rotation.

A ring gear connection rib 54, to which the ring gear 40 is connected, is provided inside the connection portion 53. The ring gear connection rib 54 has a protruding step structure that inwardly protrudes from the inside of the connection portion 53 in a radial direction. As the ring gear 40 makes surface-contact with the ring gear connection rib 54 having the protruding step structure and then is bolt or pin coupled thereto, the ring gear 40 is connected to the main frame 50 forming one body with the main frame 50. In an embodiment, the ring gear 40 and the main frame 50 may be manufactured in one body.

As such, since the ring gear 40 forms one body with the main frame 50 and the rollers 60 are coupled to the main frame 50, the planetary gear train 30 is rotated by the input rotation power of the input gear 20 and the ring gear 40 is relatively rotated by the planetary gear train 30. As a result, the main frame 50 forming one body with the ring gear 40 may be rotated.

The power transmission device 100 according to the present embodiment further includes main bearings 57a and 57b as a device for facilitating the rotation of the main frame 50. In other words, the rear main bearing 57a is arranged between the irrotational rear side fixture 70 and the main frame 50 and the front main bearing 57b is arranged between the main frame 50 and the irrotational front side fixture 8, thereby further facilitating the rotation of the main frame 50. Although the main bearings 57a and 57b are ball bearings, other types of bearings may be employed.

When the rollers 60 are coupled to the main frame 50, if the rollers 60 are fixed to the main frame 50 in a method such as indentation, the rollers 60 merely revolves along the circumference of the main frame 50 during the rotation of the main frame 50. However, in the present embodiment, the rollers 60 are relatively rotatably coupled to the main frame to be capable of rotating at its position in addition to the revolution.

Figure 6:
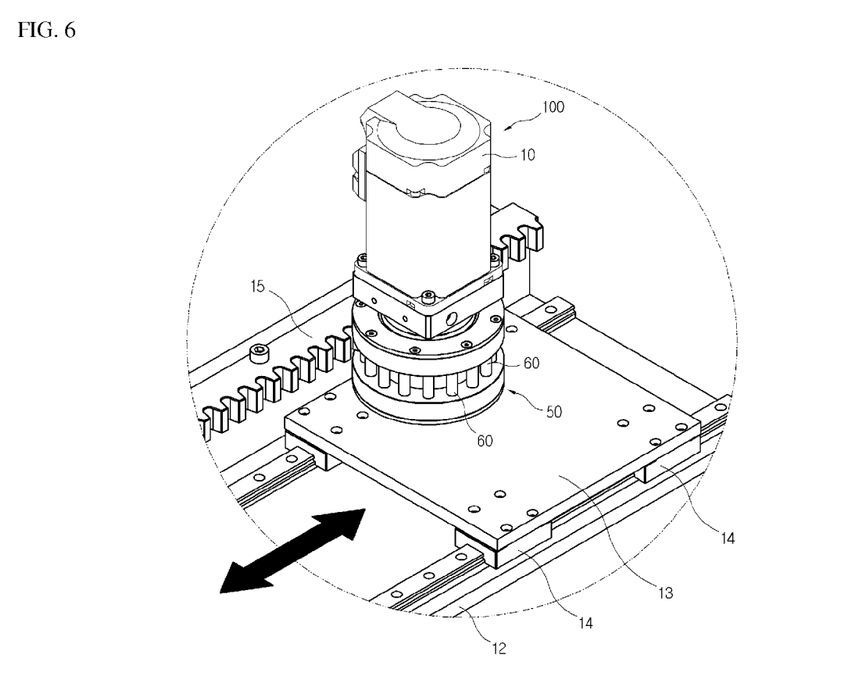
FIG. 6 is a perspective view schematically illustrating a use state of a power transmission device according to an embodiment of the present invention.
Figure 7:
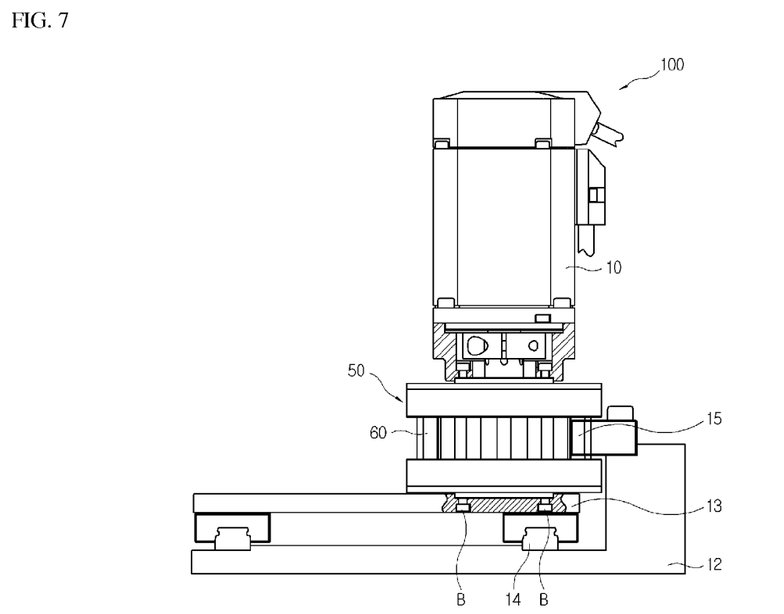
FIG. 7 is a side view schematically illustrating a structure of FIG. 6.

Accordingly, during the rotation of the main frame 50, the rollers 60 not only revolves along the the circumference of the main frame 50 but also rotates. The rotation of each of the rollers 60 is a motion performed only when the rack 15 contacts and interacts with the rollers 60 as illustrated in FIGS. 6 and 7.

To have the rollers 60 coupled to the main frame 50 to be capable of revolving and rotating altogether as described above, a structure to rotate the rollers 60 in the main frame 50 and a lubrication structure to smoothly maintain the rotation are employed together, which is described below in detail.

Referring to FIG. 5 a lubricant flow hole 61 for flowing a lubricant in a lengthwise to direction of each roller 60 is provided in each roller 60. A lubricant outlet 62 and a lubricant inlet 63, through which the lubricant is respectively exhausted and admitted in communication with the lubricant flow hole 61, are provided in a side wall of each roller 60. As illustrated in FIG. 5, the lubricant outlet 62 and the lubricant inlet 63 may be arranged to face the opposite directions in a radial direction of each roller 60 in an area of each end portion of the lubricant flow hole 61, although the present invention is not limited thereto.

In addition to the above-described lubrication structure of the rollers 60, as illustrated in FIG. 5, a lubricant flow channel 51b connected the first roller insertion holes 51a is provided in a surface of the front frame portion 51 between the neighboring first roller insertion holes 51a so that the lubricant may flow through the first roller insertion holes 51a. The lubricant flow channel 51b may be provided at both or any one of the front frame portion 51 and the rear frame portion 52. In the present embodiment, the lubricant flow channel 51b is illustrated at the front frame portion 51.

According to the present structure, the lubricant may pass through the lubricant inlet 63, the lubricant flow hole 61, and the lubricant outlet 62 and also through the first roller insertion holes 51a via the lubricant flow channel 51b. Accordingly, the rotation of each roller 60 in the main frame 50 may be further facilitated.

Referring to FIGS. 2 and 4, oil seals 55a and 56b are inserted around an area of the opposite end portions of each roller 60. Centrifugal bearings 56a and 56b for facilitating the rotation of each roller 60 are coupled to the opposite end portions of each roller 60 with the oil seals 55a and 55b interposed therebetween.

Thus, since the oil seals 55a and 55b are coupled to the opposite end portions of each roller 60 and, as described below, a rear side sealing cover 96a and a front side sealing cover 96b are coupled to the opposite end portions of the power transmission device 100, the lubricant is not exposed to the outside unlike a conventional technology and thus contamination of surrounding environment by the lubricant may be prevented.

The irrotational rear side fixture 70 and the irrotational front side fixture 80 are coupled to each other such that the ring gear 40, the main frame 50, and the main bearings 57a and 57b disposed therebetween may form one assembly.

As described above, the irrotational rear side fixture 70 and the irrotational front side fixture 80 are not rotated, unlike the main frame 50 that is rotated, and maintains a position fixed state.

In particular, in the present embodiment, the irrotational front side fixture 80, which are referred to as a carrier, is fixedly positioned without being rotated with the planetary gear train 30. Accordingly, when the planetary gear train 30 is rotated by the input rotation power of the input gear 20, the ring gear 40 that is a counterpart of the planetary gear train 30 may be relatively rotated so as to induce the rotation of the main frame 50 to which the rollers 60 are coupled.

A plurality of protruding portions 81 extending toward the irrotational rear side fixture 70 are provided at the irrotational front side fixture 80. A needle bearing 82 is coupled to each of the protruding portions 81 and connected to the planetary gear train 30. According to the structure, the irrotational front side fixture 80 may be fixedly positioned without being identically rotated with the planetary gear train 30.

The rear side sealing cover 96a and the front side sealing cover 96b are respectively coupled outside the irrotational rear side fixture 70 and the irrotational front side fixture 80. The rear side sealing cover 96a and the front side sealing cover 96b perform sealing at their positions.

Oil seals 98a and 98b are further provided between the read side sealing cover 96a and the irrotational rear side fixture 70 and between the front side sealing cover 96b and the irrotational front side fixture 80, respectively.

In the operation of the power transmission device 100 configured as above, when the motor 10 is operated, the input gear support member 21 connected to the motor 10 is rotated and thus the input gear 20 is rotated in one direction.

When the input gear 20 is rotated in one direction, the planetary gear train 30 with the three planetary gears 30a engaged with the input gear 20 is rotated.

As described above, since the irrotational front side fixture 80 is connected to the planetary gear train 30 via the needle bearing 82 coupled to each of the protruding portions 81, the irrotational front side fixture 80 is fixedly positioned at its position without being rotated with the planetary gear train 30. Accordingly, during the rotation of the planetary gear train 30, the planetary gear train 30 is rotated at the original place and thus the ring gear 40 that is the counterpart of the planetary gear train 30 is rotated.

Since the ring gear 40 forms one body with the main frame 50 via the ring gear connection rib 54, as the ring gear 40 is rotated by the operation of the planetary gear train 30, the main frame 50 is rotated together. During the rotation of the main frame 50, the rotation of the main frame 50 may be further smooth by the operation of the main bearings 57a and 57b.

When the main frame 50 is rotated by the above operation, the rollers 60 coupled to the main frame 50 revolve along the main frame 50.

On the other hand, the power transmission device 100 according to the present embodiment is not used solely as illustrated in FIG. 2, but is generally used together with the rack 15 by being attached to a device illustrated in FIGS. 6 and 7. In this case, the rollers 60 are engaged with the rack 15 to perform a linear motion with respect to the rack 15 or allow the rack 15 to perform a linear or curvilinear motion. When the rollers 60 are rotated in association with the rack 15, the revolution of each of the rollers 60 is achieved.

Next, a use state of applying the power transmission device 100 according to the present embodiment to a semiconductor apparatus or system for use is described below in detail with reference to FIGS. 6 and 7.

FIG. 6 is a perspective view schematically illustrating a use state of the power transmission device 100 according to an embodiment of the present invention. FIG. 7 is a side view schematically illustrating a structure of the power transmission device 100 of FIG. 6.

Referring to FIGS. 6 and 7, for example, when a slider 13 coupled to a base plate 12 in a rail structure, in which the rack 15 is fixed at one side of the base plate 12, has a linear motion in a direction indicated by an arrow in FIG. 6, the power transmission device 100 according to the present embodiment may be used.

While the rollers 60 provided in the power transmission device 100 are arranged in association with the rack 15 to interact therewith, the power transmission device 100 is fixed on an upper surface of the slider 12 by using a bolt B.

Then, as described above, when the motor 10 is operated, the rotation of the planetary gear train 30 is induced by the input gear 20 and thus the rotational motion of the main frame 50 via the ring gear 40 is generated. As a result, the rollers 60 coupled to the main frame 50 are rotated with the main frame 50 and thus the slider 13 performs a linear motion along the lengthwise direction of the rack 15.

Since the power transmission device 100 according to the present embodiment is fixed to the slider 13, the rollers 60 rotating with the main frame 50 performs a linear motion along the lengthwise direction of the rack 15 and thus the slider 13 may perform a linear motion in the direction indicated by the arrow in FIG. 6.

Although the power transmission device 100 according to the present embodiment may be regarded to be similar to the conventional power transmission device 1 of FIG. 1 in that the slider 13 performs a linear motion, the power transmission device 100 according to the present embodiment unlike the conventional power transmission device 1 of FIG. 1 does not have a structure of the pinion 6 coupled to the end portion of the shaft 7 protruding outwardly.

In other words, since the rollers 60 interacting with the rack 15 are coupled to the main frame 50 by being inserted therein and the main frame 50 to which the rollers 60 are coupled is compactly assembled between the irrotational rear side fixture 70 and the irrotational front side fixture 80, the size, particularly the height, of the power transmission device 100 may be reduced. Thus, the power transmission device 100 according to the present embodiment may be applied to compact equipment.

In addition, since the power transmission device 100 according to the present embodiment has a simple structure to guide the rotational motion of the rollers 60 in association with a relative rotation of the input gear 20, the planetary gear train 30, and the ring gear 40 located inside the power transmission device 100, unlike the conventional power transmission device 1 of FIG. 1, complicated peripheral parts such as a gear box or a shrink fitting coupling are not needed.

As such, since the power transmission device 100 according to the present embodiment may be provided in a simple structure, the frequencies of a maintenance work and a cleaning work may be remarkably reduced compared to the conventional technology and thus a process delay may be prevented.

Also, according to the present embodiment, since an installation height is reduced due to the simple structure, the power transmission device 100 according to the present embodiment may be applied to compact equipment. Also, the use of complicated peripheral parts may be reduced unlike the conventional technology. Furthermore, the frequencies of the maintenance work and the cleaning work may be remarkably reduced compared to the conventional technology and thus a process delay may be prevented.

Figure 8:
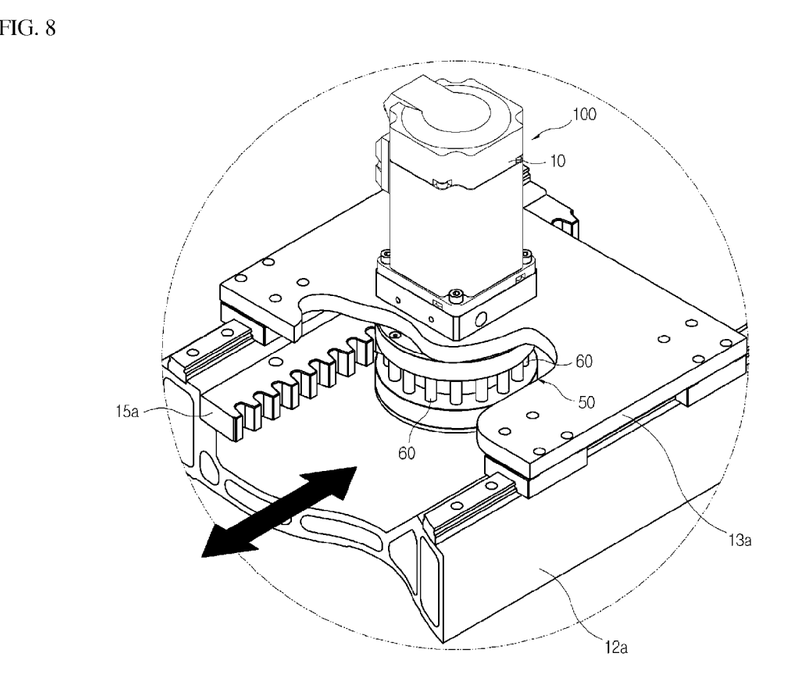
FIG. 8 is a perspective view schematically illustrating user states of another type of a power transmission device according to an embodiment of the present invention.
Figure 9:
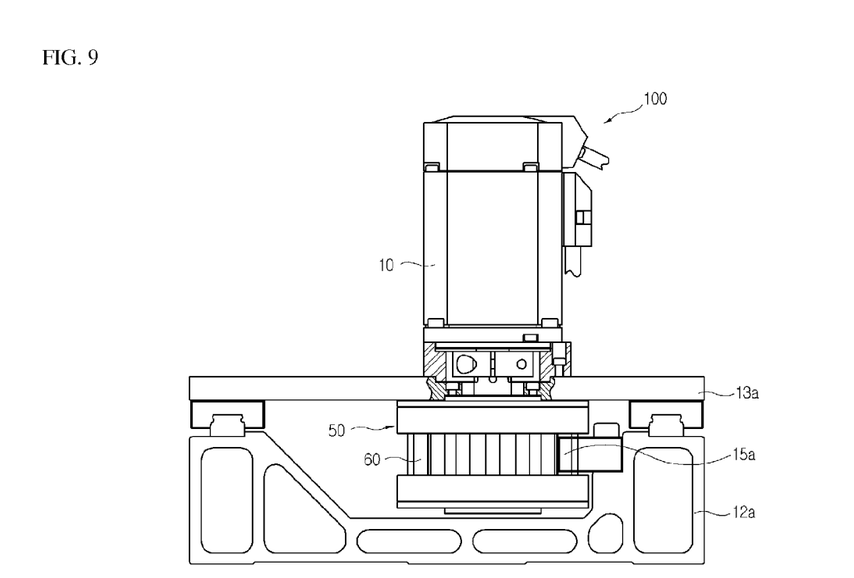
FIG. 9 is a side view schematically illustrating a structure of FIG. 8.

FIG. 8 is a perspective view schematically illustrating user states of another type of the power transmission device 100 according to an embodiment of the present invention. FIG. 9 is a side view schematically illustrating a structure of the power transmission device 100 of FIG. 8.

The power transmission device 100 of FIGS. 6 and 7 is coupled to the upper surface of the slider 13. However, in the power transmission device 100 of FIGS. 8 and 9, a partial area, that is, an area of the main frame 50, is arranged between the base plate 12a and the slider 13a so that the rollers 60 may interact with the rack 15a.

The power transmission device 100 according to the present embodiment configured as above has no problem in performing a linear motion of the slider 13a in the direction indicated by the arrow of FIG. 8.

Figure 10:
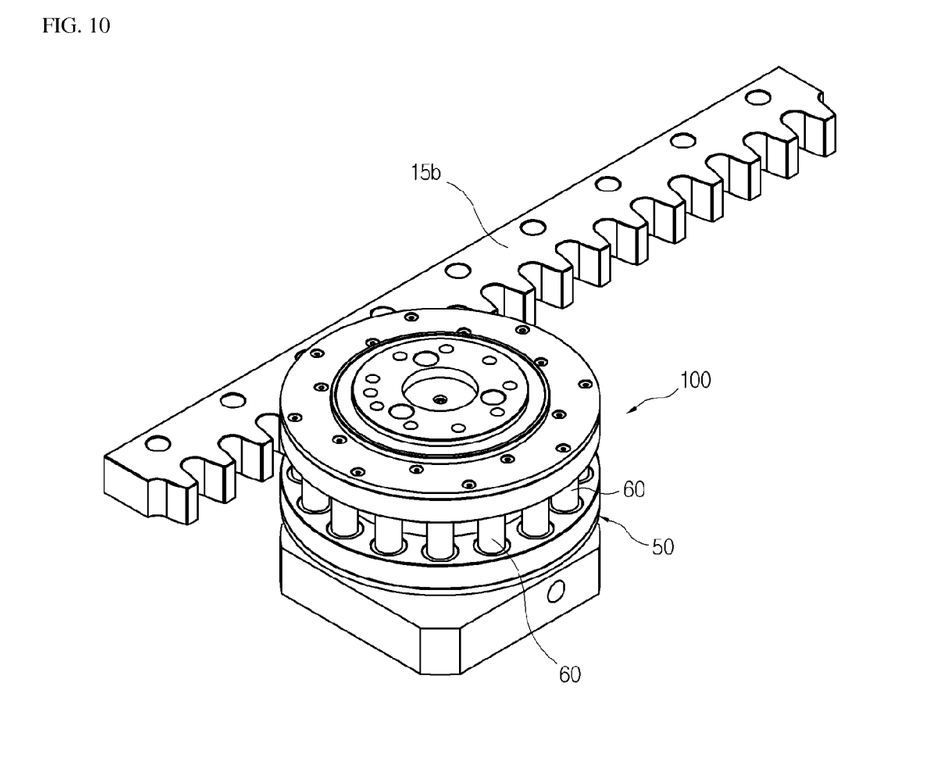
FIGS. 10 through 12 are perspective views schematically illustrating use states of a variety of types of a power transmission device according to an embodiment of the present invention.
Figure 11:
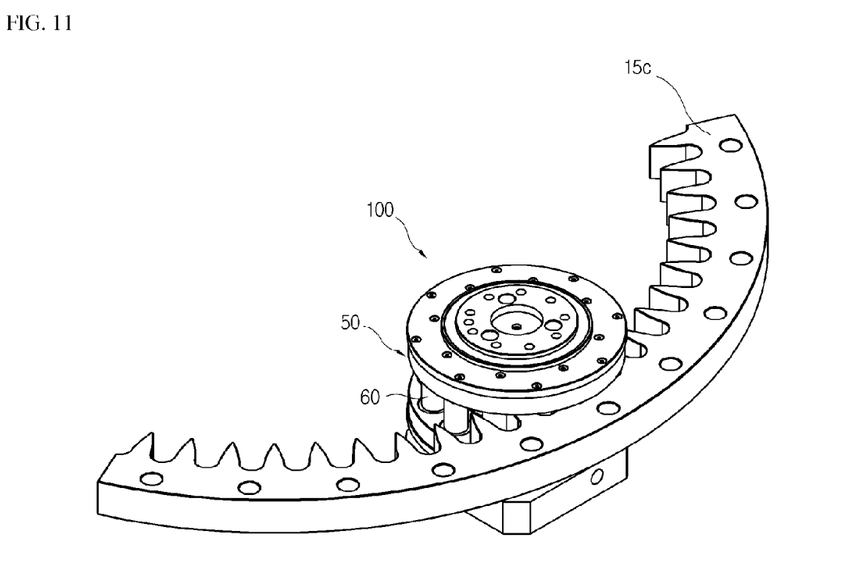
Figure 12:
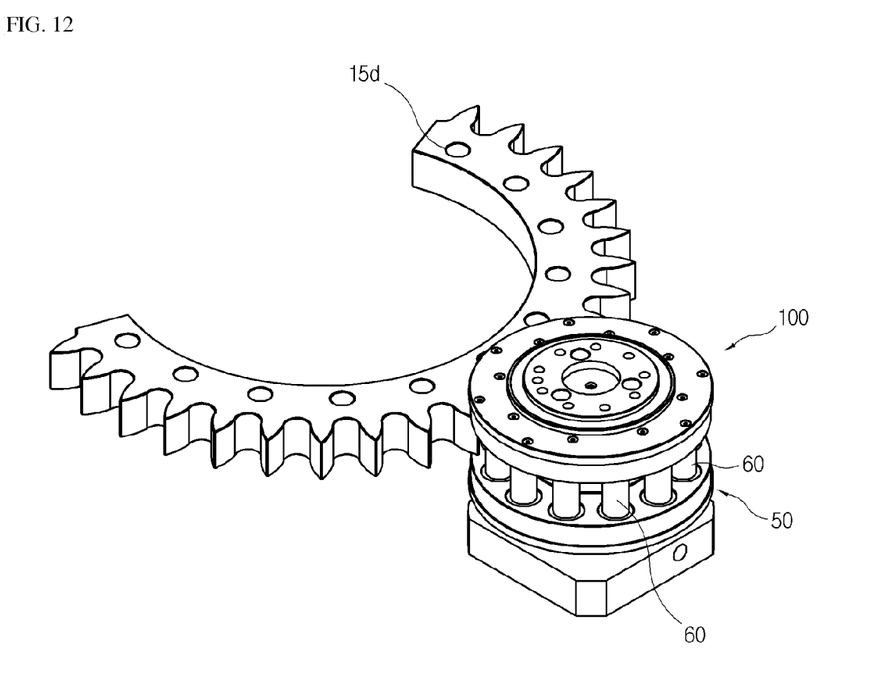

FIGS. 10 through 12 are perspective views schematically illustrating use states of a variety of types of a power transmission device according to an embodiment of the present invention. In the above-described embodiments, the slider 13 or 13a (see FIGS. 6 and 8) to which the power transmission device 100 according to the present embodiment is coupled performs a linear motion. However, the opposite case is possible.

For example, as illustrated in FIG. 10, when the power transmission device 100 according to the present embodiment is fixedly positioned and the rollers 60 are rotated, a rack 15b may perform a linear motion.

Likewise, as illustrated in FIGS. 11 and 12, when the power transmission device 100 according to the present embodiment is fixedly positioned inscribing or circumscribing racks 15c and 15d, respectively, and the rollers 60 are rotated, the racks 15c and 15d may perform a linear motion.

As a result, the power transmission device 100 according to the present embodiment may be used to allow the slider 13 or 13a (see FIGS. 6 and 8) to which the power transmission device 100 according to the present embodiment is coupled to perform a linear motion or to allow the opposite racks 15b to 15d to perform a linear or rotational motion. Such uses may be appropriately selected to fit to the environment of an apparatus or system adopting the power transmission device 100 according to the present embodiment.

As described above, according to the present invention, since a power transmission device has a simple structure, installation height may be reduced so as to be easily applied to compact equipment, use of complicated peripheral accessories may be reduced unlike a conventional technology, and further, frequencies of a maintenance work and a cleaning work may be remarkably reduced compared to the conventional technology, and thus, a process delay may be prevented.

While the present invention has been particularly shown and described with reference to preferred embodiments using specific terminologies, the embodiments and terminologies should be considered in descriptive sense only and not for purposes of limitation. Therefore, it will be understood by those of ordinary skill in the art that various changes in form and details may be made therein without departing from the spirit and scope of the present invention as defined by the following claims.

INDUSTRIAL APPLICABILITY

The present invention may be used for a variety of fields requiring power transmission, for example, semiconductor equipment, display equipment, automobile or vessel related equipment, precision controlled equipment, robot equipment, etc.

The invention claimed is:

1. A power transmission device comprising:
an input gear connected to a motor and rotated by the motor in forward and backward directions;
a planetary gear train circumscribing the input gear around the input gear and rotating in association with a rotation of the input gear;
a ring gear inscribed by the planetary gear train and relatively rotated by the planetary gear train;
a main frame to which a plurality of rollers that interact with a rack and relatively rotate are coupled in a circumferential direction, the main frame being coupled to the ring gear around the ring gear;
an irrotational rear side fixture arranged in an area where the input gear is located; and
an irrotational front side fixture arranged at a side opposite to the irrotational rear side fixture, with the ring gear and the main frame disposed therebetween and coupled to the irrotational rear side fixture,
wherein the main frame comprises:
a front frame portion having a plurality of first roller insertion holes into which the plurality of rollers are inserted;
a rear frame portion having a plurality of second roller insertion holes connected to the plurality of first roller insertion holes and arranged parallel to the front frame;
a connection portion connecting the front frame portion and the rear frame portion;
a rear side sealing cover arranged outside the irrotational rear side fixture and supporting the irrotational rear side fixture; and
a front side sealing cover arranged outside the irrotational front side fixture and supporting the irrotational front side fixture.

2. The power transmission device of claim 1, wherein a ring gear connection rib to which the ring gear is connected is further provided inside the connection portion.

3. The power transmission device of claim 1, wherein a lubricant flow hole through which a lubricant flows along a lengthwise direction of each of the plurality of rollers is provided in each of the plurality of rollers.

4. The power transmission device of claim 3, wherein a lubricant outlet and a lubricant inlet, through which the lubricant is respectively exhausted and admitted in communication with the lubricant flow hole, are provided in a side wall of each of the plurality of rollers.

5. The power transmission device of claim 4, wherein the lubricant outlet and the lubricant inlet are arranged to face the opposite directions in a radial direction of each of the plurality of rollers in an area of each end portion of the lubricant flow hole.

6. The power transmission device of claim 3, wherein a lubricant flow channel for allowing flow of the lubricant is further provided between the neighboring first roller insertion holes or the neighboring second roller insertion holes.

7. The power transmission device of claim 6, wherein the lubricant flow channel is provided at the front frame portion to be connected to the plurality of first roller insertion holes.

8. The power transmission device of claim 1, further comprising:
an oil seal coupled to each of end portions of each of the plurality of rollers and hermitically sealing a corresponding position; and
a centrifugal bearing coupled to each end portion of each of the plurality of rollers at a position outside the oil seal and facilitating a rotation of each of the plurality of rollers.

9. The power transmission device of claim 1, further comprising at least one main bearing arranged in an area between the irrotational rear side fixture and the main frame or between the main frame and the irrotational front side fixture and facilitating a rotation of the main frame.

10. The power transmission device of claim 9, wherein the main bearing comprises:
a rear main bearing arranged between the irrotational rear side fixture and the main frame; and
a front main bearing arranged between the main frame and the irrotational front side fixture.

11. The power transmission device of claim 1, wherein a plurality of protruding portions extending toward the irrotational rear side fixture are provided at the irrotational front side fixture, and a needle bearing is coupled to each of the plurality of protruding portion and connected to the planetary gear train.

12. The power transmission device of claim 1, wherein an oil seal is further arranged between the rear side sealing cover and the irrotational rear side fixture and between the front side sealing cover and the irrotational front side fixture.

13. The power transmission device of claim 1, further comprising:
an input gear support member supporting the input gear;
an adaptor on which the motor is accommodated; and
at least one connection device rotatably connecting the input gear support member to the motor adaptor.

14. The power transmission device of claim 13, wherein the connection device comprises:
an input gear support bearing inserted around the input gear support member and connected to a flange area of the input gear support member;
a clamp inserted around the input gear support member with the input gear support bearing and coupling a motor shaft of the motor to the input gear support motor; and
an oil seal coupled to the input gear support member to prevent leakage of the lubricant between the input gear support bearing and the clamp.

15. The power transmission device of claim 1, wherein the planetary gear train comprises three planetary gears that are teeth-engaged with an outer surface of the input gear and an inner surface of the ring gear and rotated in association with a rotation of the input gear.

* * * * *